(12) United States Patent
Sasabe et al.

(10) Patent No.: US 7,120,686 B2
(45) Date of Patent: Oct. 10, 2006

(54) METHOD AND SYSTEM FOR NOTIFICATION OF MAINTENANCE INFORMATION USING PORTABLE TERMINAL AND COMPUTER PROGRAM PRODUCT

(75) Inventors: Susumu Sasabe, Tokyo (JP);
Shin-Ichiro Hayano, Tokyo (JP);
Toshibumi Kawano, Tokyo (JP);
Yasuhiro Uemura, Tokyo (JP);
Hiroyuki Hayashi, Tokyo (JP); Shingo Fukui, Tokyo (JP)

(73) Assignee: NEC Corporation, Tokyo (JP)

( * ) Notice: Subject to any disclaimer, the term of this patent is extended or adjusted under 35 U.S.C. 154(b) by 874 days.

(21) Appl. No.: 09/906,136

(22) Filed: Jul. 17, 2001

(65) Prior Publication Data

US 2003/0046329 A1    Mar. 6, 2003

(30) Foreign Application Priority Data

Jul. 17, 2000   (JP) .............................. 2000-216337

(51) Int. Cl.
*G06F 15/173*   (2006.01)
(52) U.S. Cl. ...................... 709/224; 709/223
(58) Field of Classification Search .................. 714/4, 714/31, 47, 48; 709/203, 217, 219, 223, 709/224; 379/21
See application file for complete search history.

(56) References Cited

U.S. PATENT DOCUMENTS 5,745,692 A * 4/1998 Lohmann et al. ........... 709/223
6,327,677 B1 * 12/2001 Garg et al. .................. 714/37
6,477,667 B1 * 11/2002 Levi et al. ................... 714/57
6,529,723 B1 * 3/2003 Bentley ....................... 455/405

FOREIGN PATENT DOCUMENTS

| JP | 3-292036    | 12/1991 |
|----|-------------|---------|
| JP | 10-173655   | 6/1998  |
| JP | 11-68942    | 3/1999  |
| JP | 11-234271   | 8/1999  |
| JP | 11-234273   | 8/1999  |
| JP | 11-353332   | 12/1999 |
| JP | 2000-69161  | 3/2000  |
| JP | 2000-134328 | 5/2000  |
| JP | 2000-134361 | 5/2000  |
| JP | 2000-156680 | 6/2000  |

OTHER PUBLICATIONS

"How Cellular Technology Works," Modern Office Technology Apr. 1985, vol. 30 Iss. 4 p. 90.*
Brooks, Andree "Phone service lets you know who's on the other end" Austin American Statesman Mar. 9, 1992, p. B5.*
"Internet: How to deal effectively with email and avoid information overload" The Bangkok Post, Dec. 29, 2999 p. 1.*
Goldszmidt, G.S "Load management for scaling up Internet services". Network Operations and Management Symposium, 1998. NOMS 98., IEEE, vol. 3, Iss., Feb. 15-20, 1998, pp. 828-835 vol. 3.*

* cited by examiner

*Primary Examiner*—William C. Vaughn, Jr.
*Assistant Examiner*—Joseph Maniwang
(74) *Attorney, Agent, or Firm*—Young & Thompson

(57) ABSTRACT

A maintenance information providing server (Web server) 20 that transmits maintenance information to a portable terminal carried by a vendor or a customer is appended to the network management system (NMS) 21 supervising the network 2, server 20 on receipt of malfunction information from the NMS 21, notifying the malfunction to one or more pre-registered portable terminals (23, 13, 33) of a communication service purveyor, vendor or the customer.

44 Claims, 14 Drawing Sheets

|  | INFORMATION FOR CUSTOMER | IN-CARRIER INFORMATION | VENDOR ORIENTED INFORMATION |
|---|---|---|---|
| CUSTOMER | O | X | X |
| IN-CARRIER PERSONNEL IN CHARGE | O | O | O |
| PERSONNEL OF A VENDOR IN CHARGE | X | X | O |

FIG. 2

|  | INFORMATION FOR CUSTOMER | IN-CARRIER INFORMATION | VENDOR ORIENTED INFORMATION |
|---|---|---|---|
| CUSTOMER | ○ | × | × |
| IN-CARRIER PERSONNEL IN CHARGE | ○ | ○ | ○ |
| PERSONNEL OF A VENDOR IN CHARGE | × | × | ○ |

METHOD AND SYSTEM FOR NOTIFICATION OF MAINTENANCE INFORMATION USING PORTABLE TERMINAL AND COMPUTER PROGRAM PRODUCT

FIELD OF THE INVENTION

This invention relates to a technique for maintenance and management of a network. More particularly, it relates to a method and a system applied with advantage to a maintenance service business for a network and to a computer program product installed on a computer system for performing the maintenance services.

BACK GROUND OF THE INVENTION

In communication services, typified by telephone, facsimile transmission and packet data communication, a variety of services are offered by a communication service provider, also termed a carrier, which is a communication business company for operating and managing a communication network 2 and a network management system (NMS) for monitoring state of the communication network 2 as shown for example in FIG. 13, wherein the communication network 2, sometimes abbreviated to network, is such as ISDN (Integrated Service Digital Network) which is made up of plural network equipments(NE) being interconnected.

The network equipment (NE) has such functions as
  transmitting signals;
  deciding a route for providing an interconnection; and
  transmitting a received packet to a next network equipment.

A communication service provider is offering a portion of the network 2 to an Internet service provider, abbreviated to ISP, and to customers, such as enterprises gratuitously or non-gratuitously. Meanwhile, these customers are treated as end customers by the communication service provider and hence are also called end customers.

An ISP connects its own information processing system 10, also termed IT system, such as an office LAN (local area network), by using for example a leased line through a CPE (customer premise equipment; an equipment for a protocol conversion) to the network 2 of the communication service provider to provide a variety of Internet services to customers.

An enterprise also connects is own IT system 10 through a CPE (customer premise equipment) to a network of the communication service provider to provide a variety of Internet services to an office system.

SUMMARY OF THE DISCLOSURE

If a malfunction occurs on a network of a communication service provider, the communication service provider is requested to recover the network as promptly as possible to maintain services for customers.

More specifically, should a malfunction, indicated by a mark X, occur in a network equipment $NE2_1$, as shown schematically in FIG. 14, a personnel in charge of maintenance in the carrier, after identifying a site of occurrence and contents of the malfunction, takes necessary steps for recovery.

Should the malfunction have occurred on network equipment itself, the communication service provider requests a vendor, which has furnished the network equipment to take necessary steps, such as maintenance operation.

A personnel in charge of maintenance in the carrier, who is going to request the network equipment vender to take necessary steps, contacts a call center 32 which is a reception office of the vendor responsible for claims pertinent to malfunctions, by using telephone, FAX or a pager (pocket bell). The call center 32, thus contacted, communicates with a maintenance branch 30 as necessary to request the maintenance branch 30 to perform maintenance operations by telephone, FAX or a pager.

The maintenance branch 30 communicates with a technical branch that has designed or manufactured the network equipment as necessary to dispatch a personnel in charge of maintenance for recovering the malfunction to the site where the malfunction has occurred.

On the other hand, if an inquiry as to status of the malfunction is made by a customer to a call center 22 which is a reception office in the carrier responsible for claims pertinent to malfunctions, the call center 22, after getting state of the malfunction by contacting a personnel in charge of maintenance in the carrier and verifying the state of the malfunction, makes a reply to the customer.

In a conventional network system, as described above, since transportation of information pertinent to a malfunction of a network equipment to the network equipment vendor or to customers is done by manual operation, and telephone call etc., the transportation of information is delayed to render it difficult to start recovery operation promptly after an occurrence of the malfunction.

Moreover, a fact that information of state and/or recovery process of a malfunction on a network cannot be furnished continually to a customer exploiting network services is not desirable since it means insufficient service to the customer.

It is therefore an object of the present invention to provide a method and a system, a sever for providing maintenance information and a computer program product, each of which enables necessary maintenance information to be transmitted promptly to a network element vendor or to a customer on occurrence of a malfunction on a network.

For accomplishing the above object, in accordance of one aspect of the present invention, is provided a method for providing maintenance information of a network employing at least a portable terminal wherein on occurrence of a malfunction on the network the malfunction is notified to one or more pre-registered portable terminals from a maintenance information providing server which has acquired malfunction information of the network.

In accordance with another aspect of the present invention, on occurrence of malfunction in a network, the malfunction is notified from a maintenance information providing server to at least one of portable terminals of a group of portable terminals consisting of one or more portable terminals of maintenance personnel of the communication service providers for managing the network pre-registered in the maintenance information providing server, one or more portable terminals of maintenance personnel of the vendor of equipment making up the network and one or more portable terminals of personnel in charge of the customer connected to the network. This reduces the time involved in announcing the malfunction information to the maintenance personnel, but also renders it possible to execute network maintenance operation from a portable terminal.

In accordance with another aspect of the present invention, when the portable terminal accesses the maintenance information providing server, a password is input from the portable terminal. The maintenance information-providing server on receipt of the password authenticates the password and, if the result is valid, the malfunction information is transmitted to the portable terminal.

According to the present invention, the maintenance information providing server sorts the information to be notified to the portable terminal depending on which of the communication service provider managing the network, vendor of the network equipment and the customer belongs the portable terminal to transmit the so-sorted information.

According to the present invention, the information provided from the maintenance information providing server to the portable terminal is not limited to the network malfunction information, such that the maintenance information pertinent to testing and/or construction of the network may be provided to the portable terminal.

In accordance with another aspect of the present invention is provided a system for providing network maintenance information comprising:

a network management system for managing a network; and a maintenance information providing server for receiving malfunction information of the network acquired by said network management system, said maintenance information providing server comprising means for notifying the malfunction to one or more pre-registered portable terminals on receipt of said malfunction information.

According to the present invention, on occurrence of the malfunction in said network, the malfunction is notified from said maintenance information providing server to at least one of portable terminals of a group of portable terminals pre-registered in said maintenance information providing server, said group of the portable terminals being comprised of:

one or more portable terminals of one or more personnel in charge of a maintenance of a communication service provider managing said network;

one or more portable terminals of one or more personnel in charge of maintenance of a vendor of the equipment forming said network; and one or more portable terminals of one or more personnel in charge of a customer connected to said network.

The maintenance information providing server preferably comprises means for connecting with a radio base station over a wireless connection link and notifies the malfunction to said portable terminal over a mobile communication network.

In accordance with another aspect of the present invention is provided a maintenance information providing server apparatus for providing network maintenance information comprising:

means for receiving malfunction information acquired by a network management system monitoring a network comprised of a plurality of network equipment interconnected;

storage means having stored therein telephone number of a portable terminal and/or an electronic mail address of a maintenance personnel notifying the network malfunction; and means for notifying the malfunction to a portable terminal of a maintenance personnel stored in said storage means by auto-dialing and/or transmitting an electronic mail to said portable terminal, on receipt of the malfunction information of said network maintenance information from said network management system, to notify malfunction.

In accordance with another aspect of the present invention is provided a computer program product recorded on a computer readable medium for causing a computer constituting a maintenance information providing server to execute the steps of (a) inputting malfunction information of a network acquired in a network management system monitoring the network comprised of a plurality of interconnected network equipment; and (b) notifying the malfunction to a portable terminal of a maintenance personnel, a telephone number and/or an electronic mail address of said a portable terminal being stored in storage means by auto-dialing and/or sending an electronic mail to said portable terminal, on receipt of the malfunction information of said network from said network management system.

In accordance with another aspect of the present invention is provided a computer program product recorded on a computer readable medium for causing a computer constituting a maintenance information providing server to execute the steps of (a) inputting the malfunction information acquired in a network management system monitoring the network comprised of a plurality of interconnected network equipment;

(b) appending a URL (uniform resource locator) of the maintenance information to the network malfunction information to send resultant information by an electric mail to a portable terminal of a maintenance personnel notifying said network malfunction, said electronic mail address of the portable terminal of the maintenance personnel being stored in storage means;

(c) prompting inputting of a password when a browser of a portable terminal on receipt of said electronic mail specifies said URL to browse said maintenance information to authenticate the input password; and (d) sending the malfunction information to said portable terminal if the result of password authentication indicates the maintenance personnel being valid.

Still other objects and advantages of the present invention will become readily apparent to those skilled in this art from the following detailed description, wherein only the preferred embodiment of the invention is shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 2 illustrates a first embodiment of the present invention.

PREFERRED EMBODIMENTS OF THE INVENTION

Figure 1:
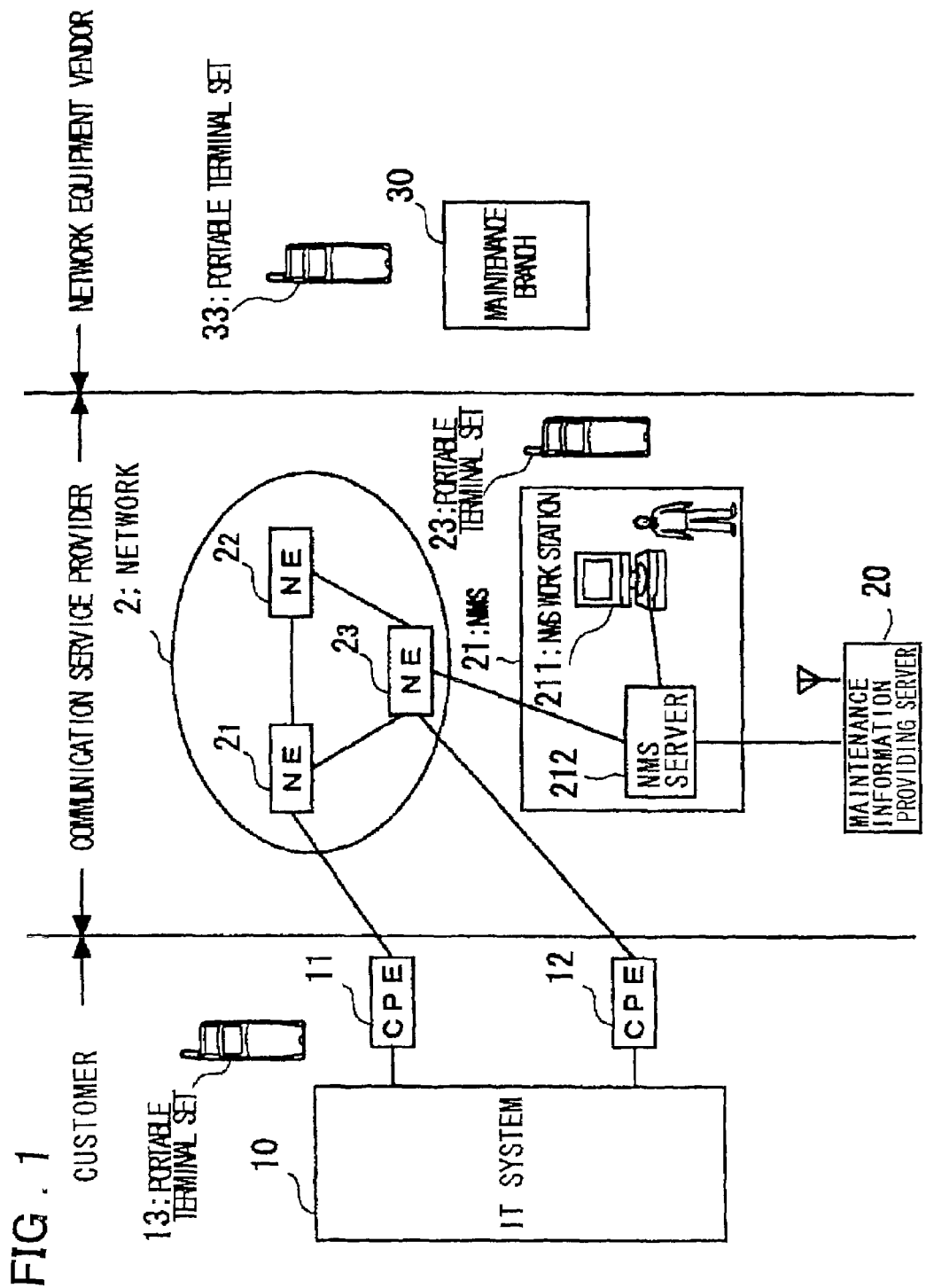
FIG. 1 shows a configuration of a first embodiment of the present invention.

In the following, a preferred embodiment of the present invention will be explained in detail. With a preferred embodiment of the present invention, a maintenance information-providing server 20 is added to a network management system (NMS) 21 which manages a network.

The maintenance information-providing server 20 provides information to a portable terminal, which is carried by a network equipment vendor or a customer. On receipt of malfunction information of the network sent from the NMS 21, the maintenance information-providing server 20 provides notification of the malfunction to at least one portable terminal of pre-registered portable terminals 13, 23, and 33.

The maintenance information-providing server 20 is preferably constructed as a Web server for providing malfunction information through the Internet to a terminal having a browser function.

The maintenance information-providing server 20 may well be constructed by implementing a function of providing maintenance information on a preset Web server. Alternatively, a dedicated server machine may construct the maintenance information-providing server 20.

The maintenance information providing server 20 preferably comprises means for communicating by a wireless communication link with a base station which constitutes a part of a mobile communication network, and provides notification of malfunction information over the mobile communication network to a portable terminal. For example, the maintenance information-providing server 20 may be provided with a wireless modem.

The maintenance information providing server 20 is connected via an interface to a portable telephone terminal (i.e., a mobile station), and notifies malfunction information from the portable telephone terminal through a base station, public telephone network, and a mobile communication network to the portable terminal.

If the portable telephone terminal is a so called PHS terminal (personal Handyphone System), a computer (server) may be connected by e.g., PIAF (PHS Internet Access Forum Standard) to the PHS terminal, or a connection may be made to the portable telephone terminal with a preset commercially available adapter.

Alternatively, the maintenance information providing server 20 may be connected to a portable telephone terminal via a wireless LAN interface, such as Bluetooth, through which the maintenance information providing server 20 is connected to a mobile communication network.

In a preferred embodiment of the present invention, malfunction information may also be provided by an electronic mail from the maintenance information-providing server 20 to a portable terminal capable of accessing to the Internet.

In such case, plural electronic mails notifying malfunction information are sent (broadcast) simultaneously from the maintenance information-providing server to plural pre-registered portable terminals. Notification of malfunction information by an electronic mail and a telephone call to a portable terminal may well be used together.

On receipt of the notification of malfunction, by an electronic mail the portable terminal extracts a URL (uniform resource locator) of maintenance information transmitted by an electronic mail from the maintenance information providing server 20 and by specifying the URL, accesses to a malfunction information screen and/or a monitoring/controlling screen of the maintenance information providing server.

When the portable terminal tries to access a screen of the maintenance information providing server 20, the maintenance information providing server 20 prompts the portable terminal to input a password and authenticates the password input from the portable terminal. If a result of authentication is proper, the maintenance information-providing server 20 transmits malfunction information to the portable terminal.

In an embodiment of the present invention, the portable terminal comprises a browser function of browsing Web servers on the Internet, or a function of processing the XML (extensible Markup Language) subset, and accesses over the Internet the maintenance information providing server operating as a Web server. Alternatively, the portable terminal may have mounted thereon a WAP (Wireless Access Protocol) which is a protocol for displaying contents on a portable terminal.

The maintenance information-providing server 20, after sorting information to be included in a notification to a portable terminal, transmits the sorted information the portable terminal. The maintenance information providing server 20 sorts information depending on whether the portable terminal belongs to a communication service provider managing the network, a network equipment vendor or a customer.

On occurrence of malfunction in a network equipment, a vendor that has furnished the network equipment is notified of a request for taking steps (a request for maintenance services) and of contents of the malfunction, and for customers of an ISP (Internet service provider) or enterprises connected to the Internet, information on state of malfunction occurrence and/or recovery process of the malfunction is provided. Thus, by selecting information based on a type of destination to which the information is to be sent, security against information leakage is accommodated to enable necessary measures to be taken promptly.

In a preferred embodiment of the present invention, plural maintenance information providing servers may be installed. The plural maintenance information providing servers provide notification information on occurrence of malfunction to the communication service provider managing the network, the vendor of the network equipment and to customers connected to the network, respectively.

In a preferred embodiment of the present invention, the maintenance information providing server 20 is connected to a network management server 212 of the network management system 21 accommodated in the communication service provider that manages and supervises the network, so that on occurrence of a malfunction on the network, malfunction information of the network acquired by the network management server 212 is transferred to the maintenance information providing server 20.

Alternatively, the maintenance information providing server 20 may not be connected in an on-line connection to the network management server 212 of the network management system provided on the communication service provider managing and supervising the network, but the information on occurrence of a network malfunction may be input in an off-line mode to the maintenance information providing server 20.

That is, a terminal 21A of the maintenance information-providing server 20 may input the information on occurrence of the malfunction directly or through a recording medium. Still alternatively, the information on the occurrence of a malfunction may be received from a terminal 211 connected to the network management server through a network, such as LAN.

In an embodiment of the present invention, the maintenance information providing server 20 includes means (201, 221 of FIGS. 1 and 12) for receiving information on a malfunction acquired in a network management system comprised of a network equipment and a network, storage means (204 of FIG. 11) having stored therein a telephone number and/or an electronic mail address of a portable terminal carried by a maintenance personnel who is to be notified of a network malfunction, and means (203 of FIG. 11) for notifying a malfunction by automatically dialing the portable terminal of the maintenance personnel stored in the storage means or by notifying the malfunction by transmitting an electronic mail, on receipt of information of the network malfunction from the network management system.

In an embodiment of the present invention, the maintenance information providing server 20 comprises means (207 of FIG. 11) for sorting information to be reported to a portable terminal and transmitting sorted information to the portable terminal (207 of FIG. 11), depending on to which of the communication service provider supervising the network, vendor of the network equipment and the customer connected to the network belongs the portable terminal. In such case, different screen information may be sent to the communication service provider, vendor and to the customer.

According to the present invention, the maintenance information providing server providing the malfunction information to a portable terminal having a browser function comprises storage means having stored therein an electronic mail address of a portable terminal of a maintenance personnel be notified of the network malfunction and further comprises:

(a) means for receiving the malfunction information acquired in a network management system for monitoring the network, comprised of network equipment and the network;

(b) means for appending URL of a site of storage of the maintenance information to a notification information on a network malfunction to transmit resulting information to a portable terminal of a maintenance personnel stored in the storage means;

(c) means for prompting inputting of a password when a browser of a portable terminal on receipt of said electronic mail specifies said URL to browse said maintenance information to authenticate the input password; and (d) sending the malfunction information to the portable terminal if a result of password authentication indicates the maintenance personnel being valid.

The functions and process of the above means (a) to (d) in the maintenance information providing server 20 are realized by a computer program executed on a computer constituting the maintenance information providing server. In such case, the computer program may be read out from a recording medium having the program recorded thereon, such as a magnetic disc, magnetic tape, CD-ROM, digital versatile disc, or semiconductor memory device, and executed on a computer to implement the maintenance information providing server of the present invention.

The present invention is not limited to a configuration of management and supervision on a communication service provider (carrier) managing and supervising a network, but may be applied to various configurations as to a site of installing the maintenance information providing server 20 and a method for network management. For example, the maintenance information providing server 20 may be installed in a vendor supplying the network equipment or in a maintenance service business company other than the communication service provider or vendor, so as to be managed and supervised by the vender, the maintenance service business company, or other maintenance service business company.

A maintenance information providing server may be constructed in such way that by a function for providing maintenance information is installed on a pre-existing Web server instead of providing a dedicated server, so that the pre-existing Web server will be operated as a maintenance information providing server. In practicing the present invention, the portable terminal may also be a portable information terminal (Personal Digital Assistant) if the terminal can be connected for communication to a mobile communication network such as portable telephone (digital cellular) network or PHS network.

In an embodiment of the present invention, a maintenance information provided from the maintenance information providing server to the portable terminal is not limited to information on occurrence of a network malfunction, but a variety of network maintenance information may be provided with or apart from the information on the malfunction.

For example, information on test or construction of a network scheduled to be carried out may be provided from the maintenance information providing server to a portable terminal of a maintenance or construction personnel of the communication service provider, the vendor supplying the network equipment, maintenance service business company other than the communication service provider or vendor, or a construction undertaker. In addition, customers may be supplied with information on network testing, schedule of a construction, or state of progress of a construction or schedule of completion if the construction is currently underway.

For more detailed explanation of a preferred embodiment of the present invention, certain preferred embodiments of the present invention will be explained with reference to the drawings.

Figure 13:
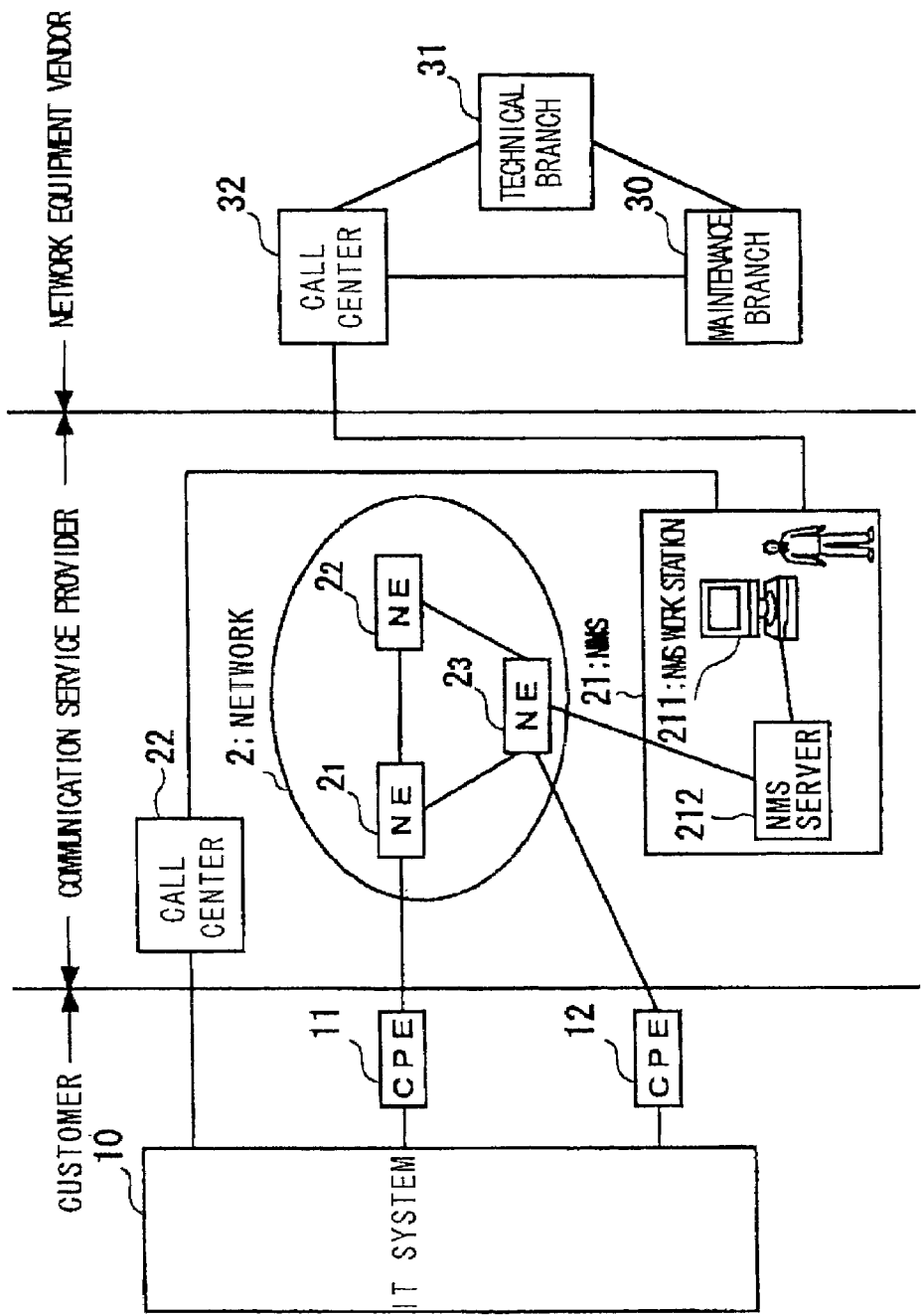
FIG. 13 shows a conventional system configuration.
Figure 14:
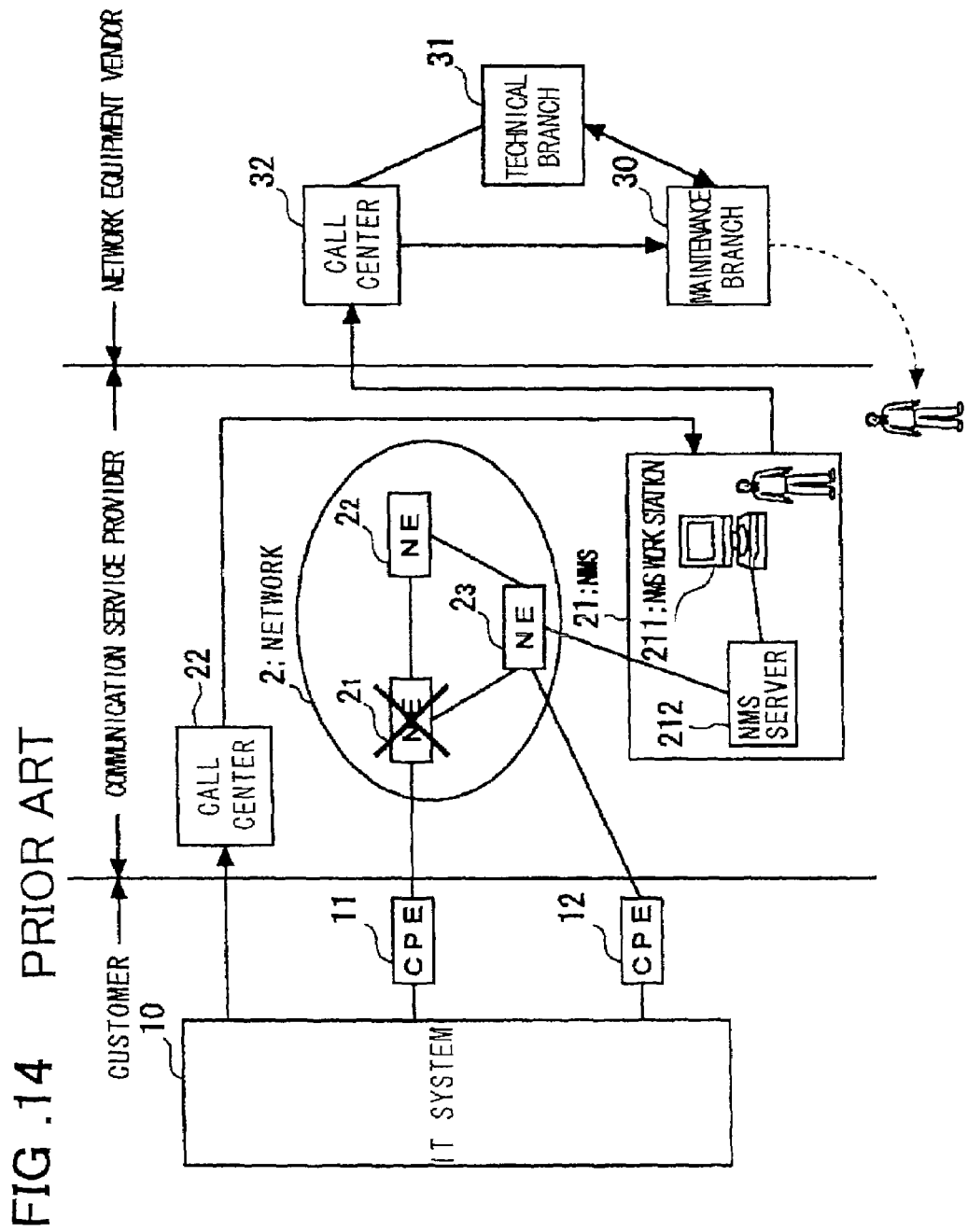
FIG. 14 illustrates a sequence of malfunction notification in a conventional system.

FIG. 1 illustrates a system structure of a first embodiment of the present invention. Referring to FIG. 1, the system, in accordance with the first embodiment of the present invention, comprises a network 2 such as ISDN and a network management system (NMS) 21 for managing the network 2. The network 2 comprises interconnected network equipments $NE2_1$ to $NE2_3$, which are explained with reference to FIG. 13.

The network management system (NMS) 21 comprises a server 212 for managing the network (termed NMS server) which is connected to network equipment, for example, $NE2_3$ and a NMS workstation 211, which is connected to the NMS server 212.

The NMS server21 collects data on operating state of the network equipment and/or the network 2.

The NMS workstation 211 receives information from the NMS server 212, displays the information on a display device, and sometimes operates as an input terminal for supplying information, such as an instruction, a command or a command file that is entered from an input device, such as a keyboard or mouse, to the NMS server 212. These are managed and supervised by a communication service provider (carrier).

IT (information technology) systems of customers such as Internet service providers (ISPs) and enterprises, are connected to the network 2 through a CPE (customer premise equipment) 11 and a CPE 12. ISP is connected to the IT systems 10 to provide a variety of Internet services to users, whilst the enterprises offer a variety of Internet services from the own IT system 10 to their employees.

The maintenance information providing server 20 is connected for communication to the NMS server 212 of the NMS 211 through a LAN or a direct channel connection to receive information on malfunction from the network management server 212 on occurrence of malfunction on the network 2 to send information on the malfunction to pre-registered portable terminal, which is a portable terminal 23 of the maintenance personnel of the carrier, a portable terminal 13 of the customer, or a portable terminal 33 of the vendor of the network equipment $NE2_1$ to $NE2_3$.

Each of the portable terminals 13, 23, and 33 has a function of receiving information transmitted from the maintenance information providing server 20 and transmitting information to the maintenance information providing server 20.

In FIG. 1, only three-network equipment is shown for simplicity in explanation. However, the present invention is not limited to this configuration, and any suitable number of the network equipment NE may be used. The number of the NMS workstation 211 connected to the NMS server 21 also is not limited to one. Moreover, in FIG. 1, although only one portable terminal is provided respectively for the carrier, vendor and customer, this is only for the sake of illustration such that plural portable terminals may be provided for each of the carrier, vendor and the customer.

On occurrence of network malfunction, the maintenance information providing server 20 sends information, having same content as information received from the NMS 21, to portable terminals of maintenance personnel of the carrier, vendor and customer, if such information is allowed to be sent in common in view of the contract contents such as obligations to confidence.

On the other hand, a customer is only notified of occurrence of malfunction on the network, a scheduled recovery time, and so forth, if it is prohibited from a contract between the vendor and the carrier, or otherwise is to be evaded to supply the customer with information such as information on details of malfunction of the network equipment and/or information on the network equipment vendor.

Moreover, if it is prohibited from a contract or otherwise is to be evaded to supply information on a customer who is connected to the network 2 to the vendor, customer information is not furnished to the vendor and only information on a network equipment suffering from malfunction (device number of the equipment, name of the equipment, installation site and status of the malfunction, that is status information) is furnished.

If plural network equipments are supplied from plural vendors, such as companies A and B, selection is made so that information on the malfunction of network equipment of the company B will not be transferred to the company A.

A portable terminal of maintenance personnel of the carrier may be supplied with all information from the maintenance information-providing server 20. Alternatively, the portable terminal of maintenance personnel of the carrier may be provided only with only necessary information selected. For example, in case that plural malfunctions occur, information of a malfunctioned network equipment located in an area taken charge of by maintenance personnel is sent to the portable terminal of the maintenance personnel.

If the carrier, customer and the vendor does registration respectively on the maintenance information providing server 20, the maintenance information providing server 20 selects information necessary for the carrier, customer and the vendor to provide the information to respective portable terminals, as shown in FIG. 2. That is, the customer is not furnished with the carrier insider information nor with information for the vendor, whilst the vendor is not furnished with information for the customer nor with the carrier insider information.

In this case, there is neither risk of customer information being disclosed to the vendor nor risk of carrier insider information being disclosed to the vendor or to the customer.

In a preferred embodiment of the present invention, an incoming call announcement form, such as ringing tone, on an incoming call at a portable terminal, may be varied depending on seriousness (degree) of the malfunction. For example, the maintenance information providing server 20 may set information designating an incoming ringing form in a call setup message to a portable terminal.

The portable terminals 13, 23, 33, made up of terminals of the portable telephone terminal (cellular-phone terminal) or PHS (Portable Handyphone System), comprises a browser function of displaying contents of an Internet Web server. The portable terminals are configured for utilizing a portable telephone terminal capable of displaying a picture information or text transmitted from the maintenance information-providing server 20. Alternatively, the portable terminals 13, 23, 33 may be a portable information terminal (PDA;Personal Digital Assistants) capable of accessing the maintenance information providing server 20.

The network equipment NE and/or network link can be operated from the portable terminal to enable remote maintenance diagnosis. More specifically, an arrangement may be made so that the network equipment NE and/or the network 2 can be operated from the portable terminals 23 and 33 within a range previously allowed by the carrier.

Referring to FIG. 1, the operation of the preferred embodiment is explained. Should some malfunction occur in the network equipment $NE2_1$, a site of occurrence and contents of the malfunction are sent as notification information to the NMS server 212 of the NMS (network management system) 21. A site of occurrence and contents of the malfunction are sent as notification information from the NMS server 212 to the maintenance information-providing server 20.

The maintenance information providing server 20 executes the notification to the portable terminals 13, 23, and 33 automatically or subject to instructions from the NMS workstation 211 operated by the maintenance personnel of the carrier.

The maintenance personnel of the carrier confirm the site of occurrence and contents of the malfunctions by the NMS workstation 211 to execute necessary measures.

If the site of occurrence of the malfunction is remote, a maintenance personnel from a service office located nearest to the site, checks the site of occurrence and contents of the malfunction with the portable terminal 23 and goes to the site of occurrence of the malfunction.

If some malfunction has occurred in network equipment, a vendor who has received a notice with the portable terminal 33 instructs maintenance personnel of a service office nearest to the site to visit the site for recovering the malfunction. The maintenance personnel carrying the portable terminal 33 may go to the site on receipt of a notification of occurrence of the malfunction.

The maintenance information-providing server 20 notifies the customer of information on a state of the malfunction and an outlook of recovery of the malfunction.

Figure 3:
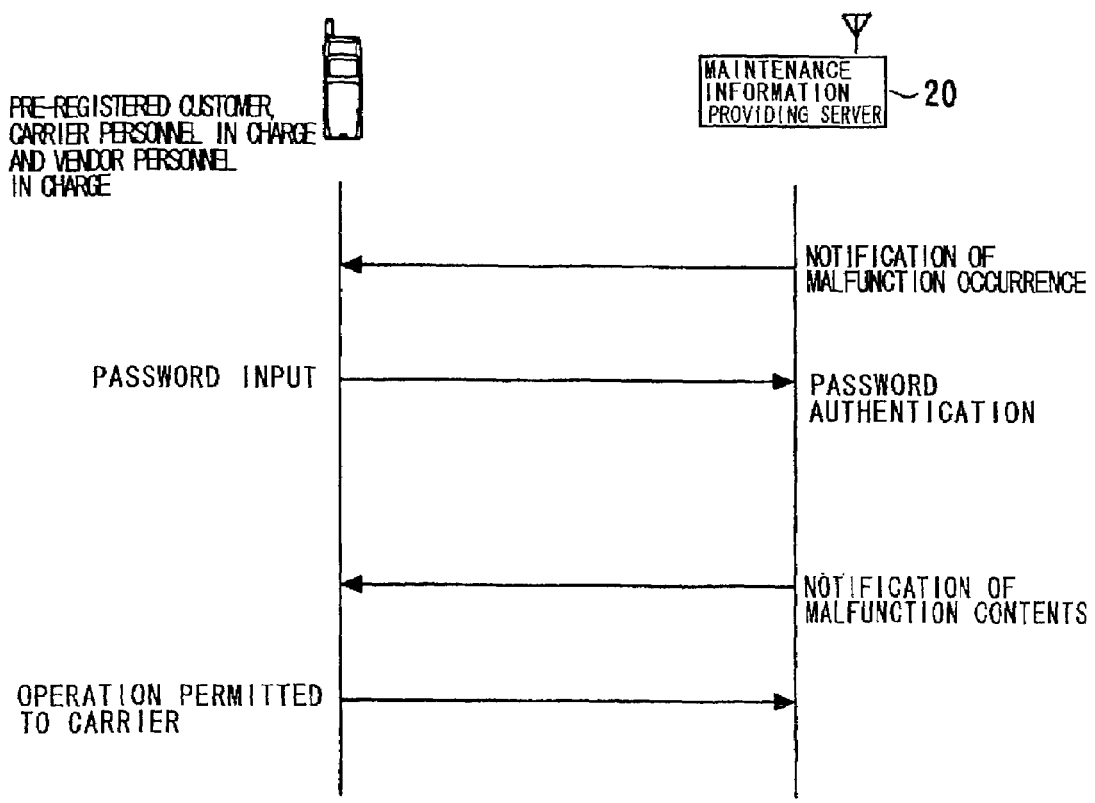
FIG. 3 shows a communication sequence in the first embodiment of the present invention.

FIG. 3 illustrates schematically communication sequences of the portable terminals 23, 33, and 13 with the maintenance information-providing server 20 in an embodiment of the present invention.

The maintenance information providing server 20 discriminates a pre-registered carrier, a customer and a vendor with e.g., an ID (identification information) code to notify a portable terminal of a party discriminated of the fact of occurrence of the malfunction. As aforementioned, the information necessary for the carrier, customer and the vendor is selected and provided to the respective portable terminal by the maintenance information-providing server 20. A ringing tone at an incoming call on portable terminal, which is notified of the information, may be differentiated depending on a degree of seriousness of the malfunction.

When a password is entered from the portable terminal, which is notified of the malfunction, the maintenance information providing server 20 receives the password and authenticates the password and, if it is confirmed that the maintenance personnel is fully authorized, the maintenance information providing server 20 notifies the portable terminal of contents of the malfunction.

The maintenance personnel then go to a site or operate the network equipment or the network link from the portable terminal within a range permitted by the carrier.

Figure 11:
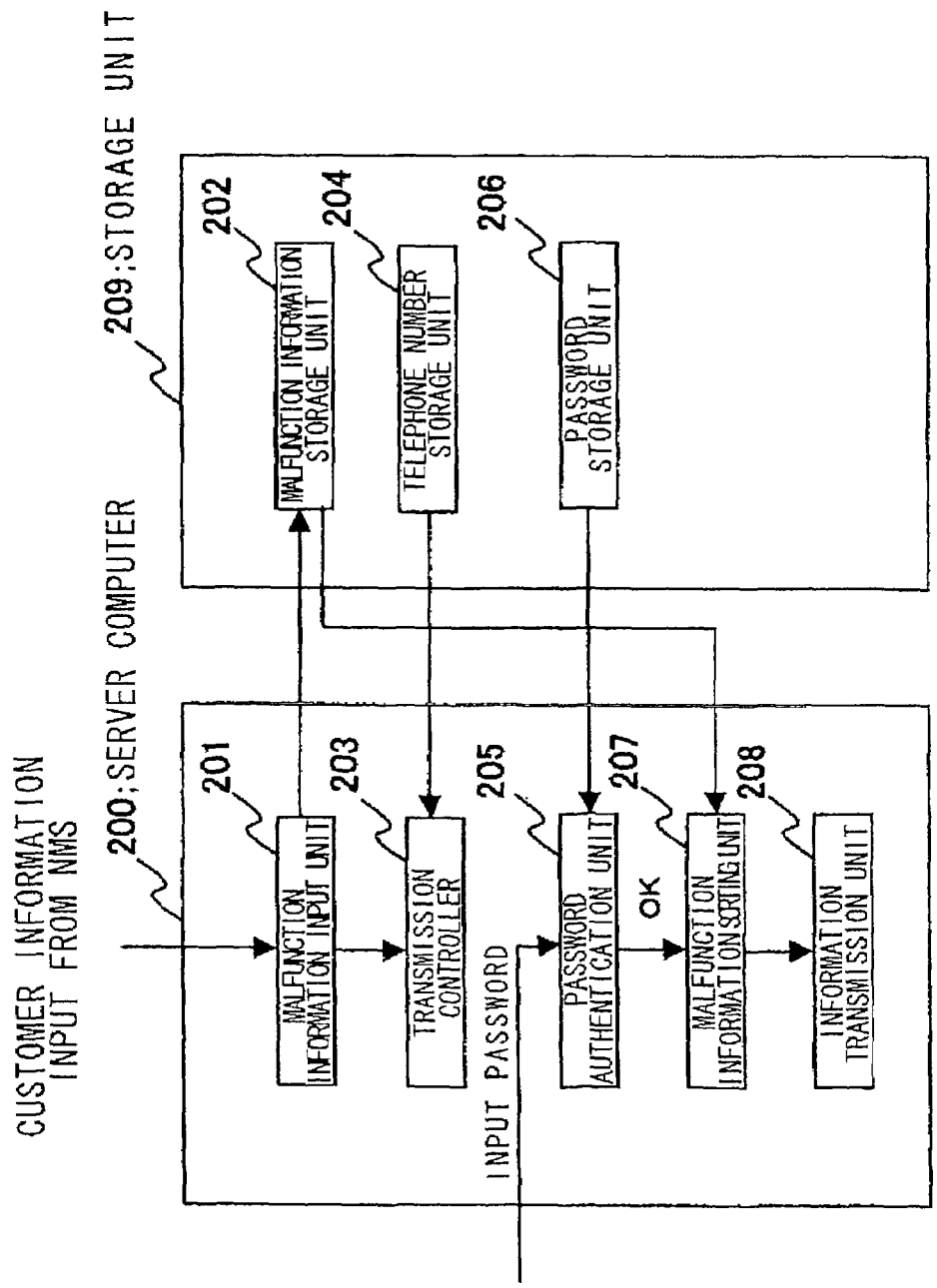
FIG. 11 shows a configuration of a maintenance information providing server in the embodiments of the present invention.

FIG. 11 shows an illustrative structure of the maintenance information-providing server 20 in a preferred embodiment of the present invention. Referring to FIG. 11, the maintenance information providing server 20 comprises a malfunction information input unit 201, for receiving a malfunction information acquired in the NMS 21 from the NMS server 212, workstation 211, an input device or from a recording medium to store the received information in a malfunction information storage unit 202, a telephone number storage unit 204 which stores a telephone number of a portable terminal of a maintenance personnel to be notified of a network malfunction, and a transmission controller 203 for notifying the portable terminal of the maintenance personnel by auto-dialing when the malfunction information input unit 201 has received the malfunction information. The telephone number storage unit 204 stores a plurality of telephone numbers of plural portable terminals in case that plural personals should be notified of network malfunction. The password storage unit 206 also stores plural passwords corresponding to plural portable terminals in case those plural personals should be notified of network malfunction.

The maintenance information providing server 20 also comprises a password storage unit 206 for storing a password of a person holding a portable terminal, and a password authentication unit 205 which, when the portable terminal received an incoming notice and a password is input from the portable terminal, receives the password, such as pushbutton (PB) signal and collates a signal obtained by decoding to a digital code to a password stored in the password storage unit 206 by way of performing authentication.

In addition, the maintenance information providing server 20 comprises a malfunction information sorting unit 207 which, if the password authentication shows that the password entered is valid, sorts the malfunction information from the malfunction information storage unit 202 depending on whether the malfunction information for the portable terminal is destined for a carrier, a vendor or to a customer, and an information transmission unit 208 for transmitting the malfunction information which is selected by the malfunction information sorting unit 207.

The information transmission unit 208 may comprises a wireless modem for communicating via q wireless link with a radio base station of a mobile communication network, or may be configured for being connected via an interface card to a portable terminal to have communication with the radio base station of the mobile communication network.

The information transmission unit 208 may also send detailed malfunction information to the portable terminal by an electronic mail. A state of the malfunction, an outlook for recovery and so forth may also be transmitted with speech guidance to the portable terminal of the customer. In this case, the speech information is automatically synthesized on the maintenance information-providing server 20. The function of the units 201 to 208 in the maintenance information providing a computer program realizes server 20 executed on a computer 200 included in the maintenance information-providing server 20. In such case, the functions of the maintenance information providing server 20 of the present invention may be realized by reading out the program from the recording medium holding the program, such as a magnetic recording medium, such as a magnetic disc, magnetic tape, CD-ROM, digital versatile disc, or a semiconductor memory device and by executing the program on the computer 200.

In an embodiment of the present invention, the maintenance information providing server is constructed as a Web server if the portable terminal has a function of accessing the Internet contents in place of the maintenance information providing server transmitting the malfunction information to the portable terminal over a telephone communication.

Figure 12:
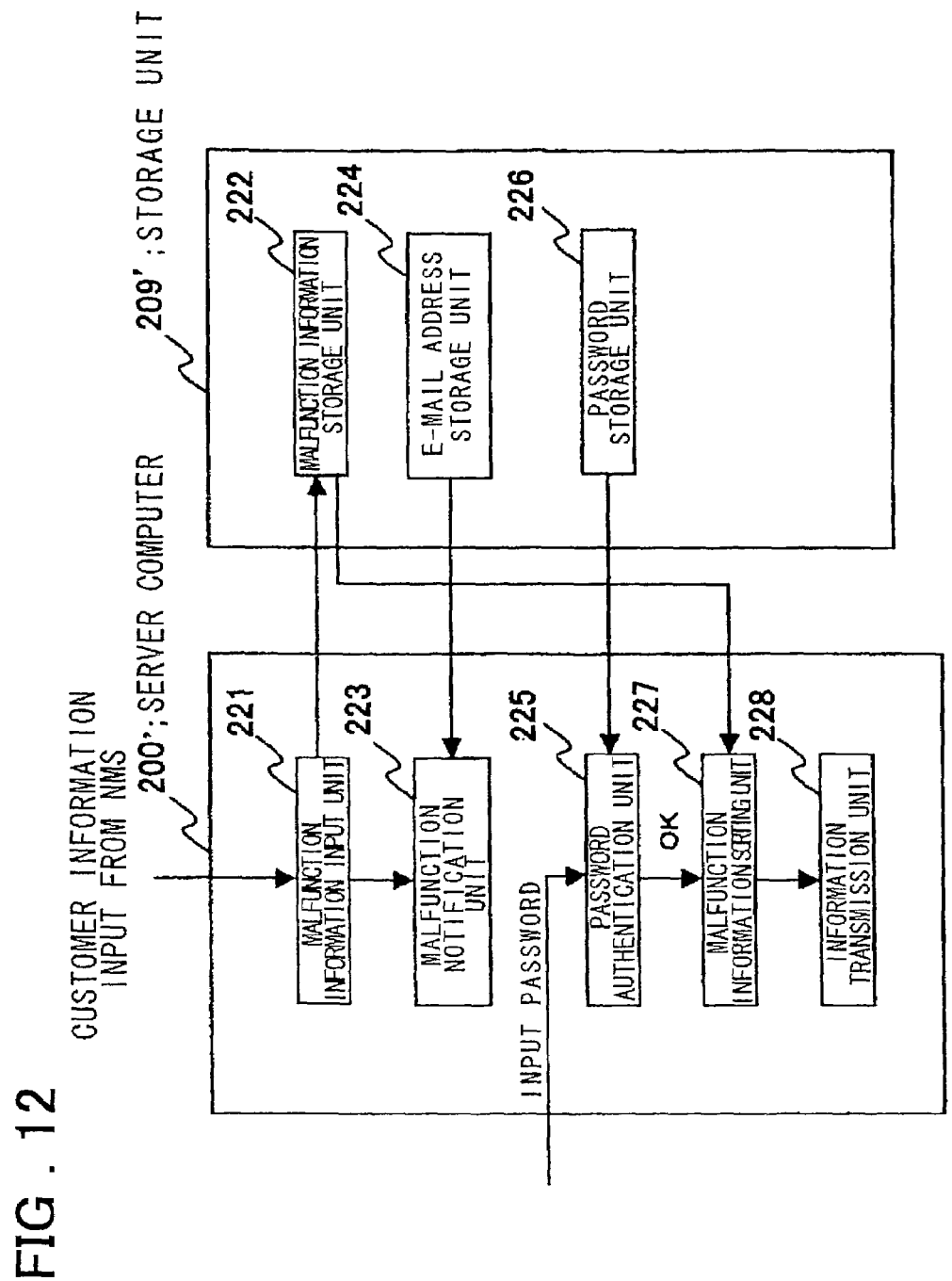
FIG. 12 shows a configuration of a maintenance information providing server (web server) in the embodiments of the present invention.

FIG. 12 illustrates a structure of a Web server having a function of providing malfunction information to a portable terminal in an embodiment of the present invention.

In FIG. 12, the maintenance information providing server 20 comprises a malfunction information input unit 221, a malfunction notification mail transmitting unit 223, a password authentication unit 225, a malfunction information sorting unit 227, an information transmission unit 228, and storage unit 208'. The storage unit 209' comprises a malfunction information storage unit 222, a mail address storage unit 224, and a password storage unit 226.

The malfunction information input unit 221 receives malfunction information, acquired by the NMS 21, from the NMS server 212, workstation 211, input device or from the recording medium for storing the information received in a malfunction information storage unit 222.

The mail address storage unit 224 holds an electronic mail address of a portable terminal of a maintenance personnel who is to be notified of malfunction on the network. The mail address storage unit 224 stores a plurality of electronic mail addresses corresponding to plural portable terminals in case that plural personals should be notified of network malfunction.

The malfunction notification mail transmitting unit 223 appends the URL (uniform resource locator) for specifying a location of the malfunction information (Web site) in the maintenance information providing server that holds the network malfunction notification to send the resulting electronic mail to the portable terminal of the maintenance personnel stored in the electronic mail address storage unit 224.

The password storage unit 226 for storing a password of a person holds the portable terminal.

The password authentication unit 225 prompts (requests) a password input to a portable terminal, which receives an electronic mail notifying the malfunction, and specifies the URL by the browser of the portable terminal for browsing the maintenance information, and collates the input password to the password stored in the password storage unit 226 by way of performing the authentication.

The malfunction information-sorting unit 227 sorts the malfunction information according to the carrier, vendor and the customer.

The information transmission unit 228 send sorted malfunction information to corresponding portable terminal in case the result of password authentication has revealed that the maintenance personnel is valid.

The web server includes a wireless modem for communicating with a radio base station of a mobile communication network or is connected over a preset interface card to a portable telephone terminal to have communication with a radio base station of the mobile communication network via the portable telephone terminal.

The control of the respective units 221 to 228 of the maintenance information providing server 20 may be realized by a computer program executed on the computer 200 of the maintenance information providing server 20. In such case, the functions of the maintenance information providing server 20 of the present invention may be realized by reading out the program from the recording medium holding the program, such as a magnetic recording medium, e.g., a magnetic disc, a magnetic tape, a CD-ROM, DVD (digital versatile disc) or a semiconductor memory, and by executing the program on the computer 200.

In the configuration of the maintenance information providing server, shown in FIG. 12, transmission of an electronic mail to a portable terminal may be coordinated to notification (transmission) by a telephone call.

An arrangement is made so that the portable terminal has a function of browsing Web servers on the Internet, a function of processing a subset of HTML (Hypertext Markup Language) or a function of processing a subset o the XML (eXtensible Markup Language) to access the maintenance information providing server 20 operating as a Web server to browse detailed malfunction information as well as to set the network maintenance processing through the NMS 21. In this case, the portable terminal owned by maintenance personnel may be a pre-existing portable telephone terminal having an Internet access capability compatible with such as i-mode service (NTT DoCoMo) and the conventional portable terminal may directly be utilized.

The malfunction information may be transmitted to the portable terminal of the maintenance personnel in a form of at least one or all of screen informations of name and location of a station where the malfunction has occurred, number and name of the malfunctioning device (network equipment), status information (error information) or supplementary information if necessary. The portable terminal may be arranged so that a light (LED) on the terminal is switched on and off in an appropriate manner to clarify an existence of the malfunctioning device.

As a graphical user interface (GUI) of the portable terminal, tables, buttons or character inputting may be made possible so that e.g., network maintenance operations may be set in an allowed range based on the inputting operation from the portable terminal.

Meanwhile, it is possible to implement WAP (wireless access protocol) which is a protocol displaying contents from a portable terminal.

The operation and effect of an embodiment of the present invention is explained. Since maintenance information of the network management system (NMS) can be provided to the maintenance personnel of the communication service provider (carrier), to the network equipment or to a network management system (vendor), on occurrence of a malfunction, an arrangement for a malfunction recovery can be made more promptly than in a case of making confirmation or request over telephone as was done in a conventional network system.

Moreover, state of occurrence of malfunction and/or information on recovery of the network malfunction can be provided to the customer to contribute to the customer service.

Figure 4:
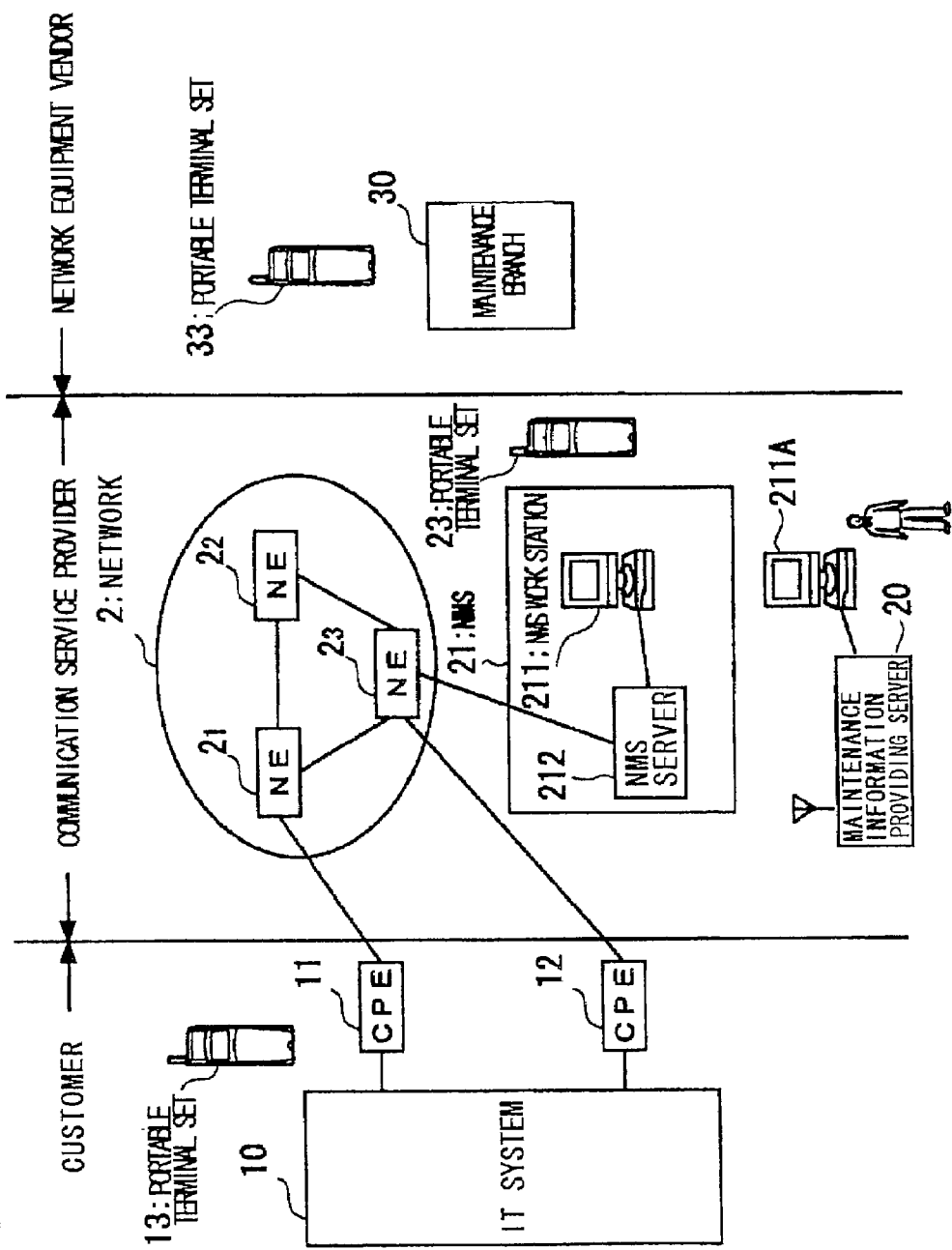
FIG. 4 illustrates a configuration of a second embodiment of the present invention.

A second embodiment of the present invention is now explained. FIG. 4 illustrates a system configuration of the second embodiment of the present invention. In FIG. 4, the present second embodiment differs from the previous embodiment shown in FIG. 1 in eliminating the communication connection (on-line connection) between the NMS server 212 and the maintenance information-providing server 20. That is, in the present second embodiment of the present invention, it is unnecessary to connect the maintenance information-providing server 20 to the NMS server 212 in a communication link.

It is only necessary for a maintenance personnel of the carrier to confirm the site of occurrence and contents of the malfunction at the NMS workstation 211 and subsequently input the site of occurrence and the contents of the malfunction from the work station 211A which is connected to the maintenance information providing server 20.

The site of occurrence and the contents of the malfunction are entered to the maintenance information-providing server 20. And then from the workstation 211A a command for executing notification of the malfunction to the portable terminals 13, 23 and 33 is inputted to the maintenance information-providing server 20. Alternatively, the NMS server 212 reads malfunction information recorded on a recording medium in the NMS server 212 to input the malfunction information in an off-line mode.

In the second embodiment of the present invention, as in the previous embodiment, the maintenance information providing server 20 is able to provide same information in common to the customer and the vendor in accordance with a command from the workstation 211A or to select only necessary information to provide selected information. Alternatively, ringing tone at the portable terminal may be made to differ depending on degree of seriousness of the malfunction.

In this embodiment, it is unnecessary to implement a function (interface) of exchanging signals between the NMS server 212 and the maintenance information-providing server 20 to facilitate the server installation to enable a service to be started in a short time. Moreover, it is unnecessary for the NMS server 212 to have a software for transferring the malfunction information to the maintenance information providing server 20 to facilitate a structure as will as to contribute to reduction of load in a system of the NMS server 212. It is also possible to transfer the malfunction information from the NMS workstation 211 through a LAN, not shown, to the workstation 211A to cause the malfunction information to be transferred from the workstation 211A to the maintenance information-providing server 20.

Figure 5:
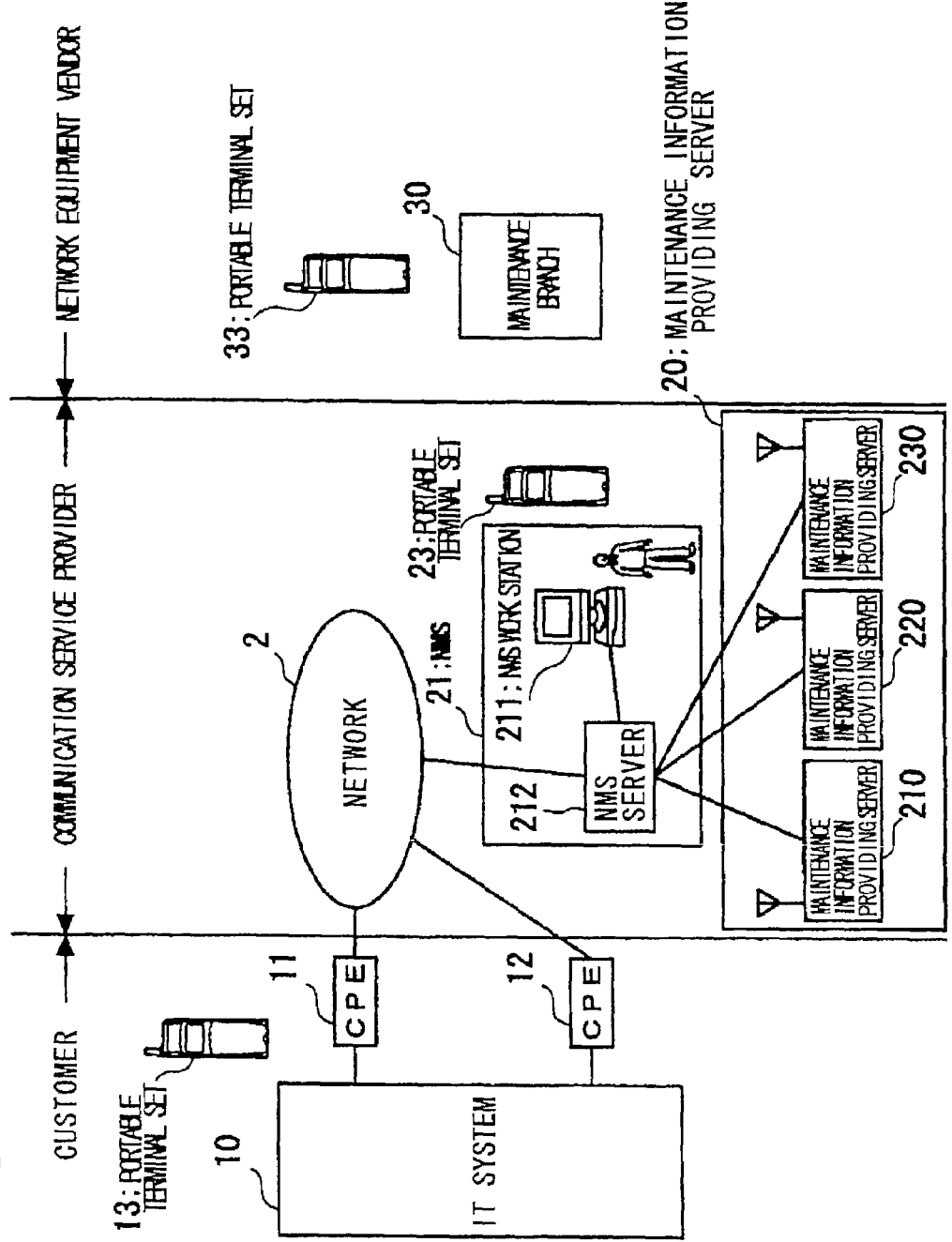
FIG. 5 illustrates a configuration of a third embodiment of the present invention.

A third embodiment of the present invention is now explained. FIG. 5 illustrates a system structure of a third embodiment of the present invention. In the above-described first embodiment, one maintenance information providing server 20 is provided for providing maintenance information to a maintenance personnel of the carrier, vendor or to the customer. However, plural such servers may be used. That is, the present third embodiment includes a maintenance information-providing server 220 for providing information to the maintenance personnel of the carrier, a maintenance information-providing server 230 for providing the information to the vendor and a maintenance information-providing server 210 for providing the information to the customer.

These servers 210, 220 and 230 are connected to the NMS server 212, such that, on occurrence of malfunction, the malfunction information is transferred to the servers 210, 220 and 230. The malfunction information provided by the servers 210, 220 and 230 to the carrier, vendor and to the customer differs from one server to another. With this system architecture, it is possible to distribute load and improve processing performance to enable prompt notification of the malfunction information.

Figure 6:
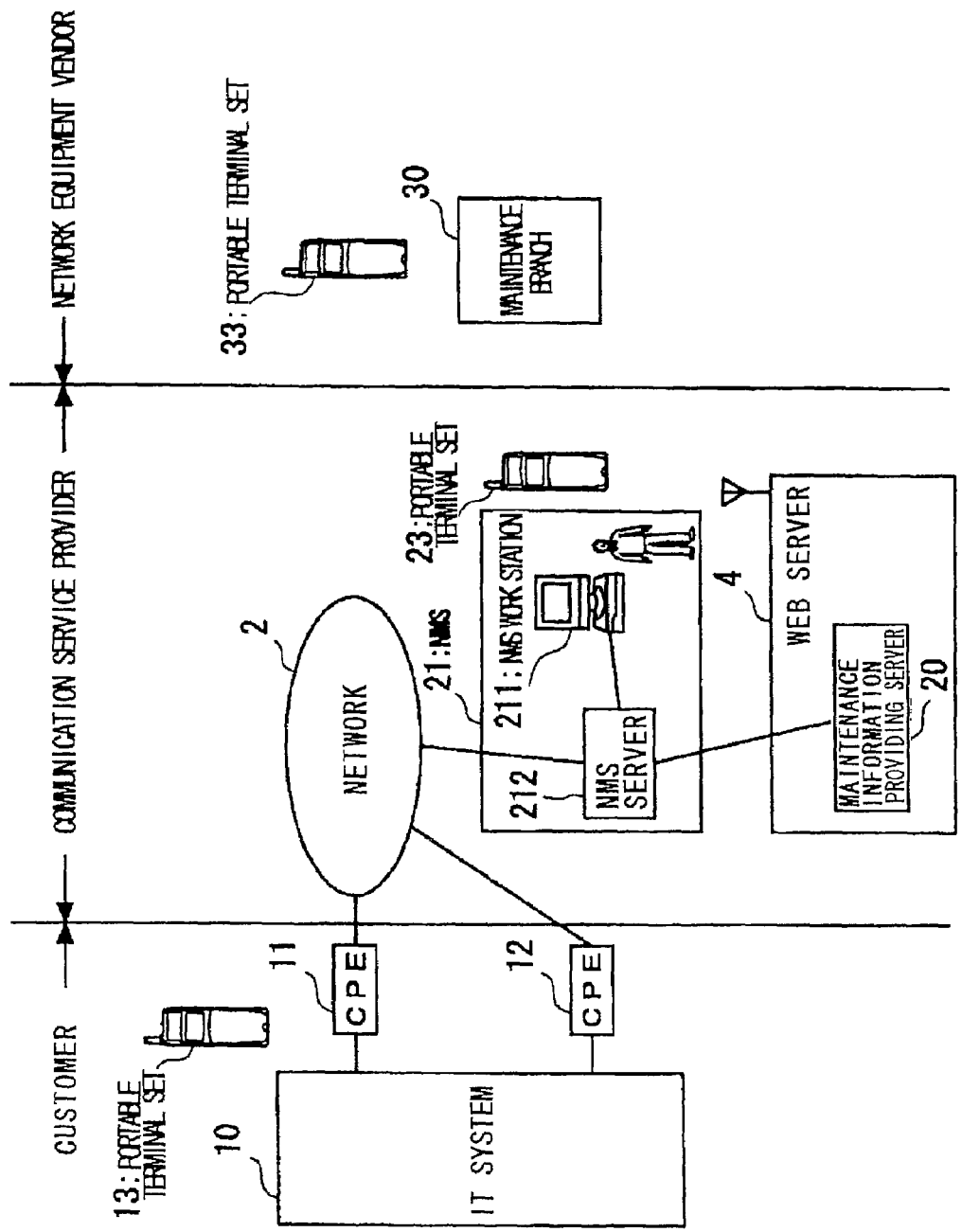
FIG. 6 illustrates a configuration of a fourth embodiment of the present invention.

A fourth embodiment of the present invention is now explained. FIG. 6 illustrates a system structure of a third embodiment of the present invention. In the above-described first embodiment, the maintenance information-providing server 20 is provided as a dedicated server. In the present fourth embodiment, the maintenance information providing function of the maintenance information providing server 20 is added to the pre-existing Web server 4 for the carrier to perform a variety of information providing services to the users of the portable terminal in general.

In the above described fifth embodiment of the present invention, in which the pre-existing Web server 4 is used in the carrier, equipment investment is unnecessary.

Figure 7:
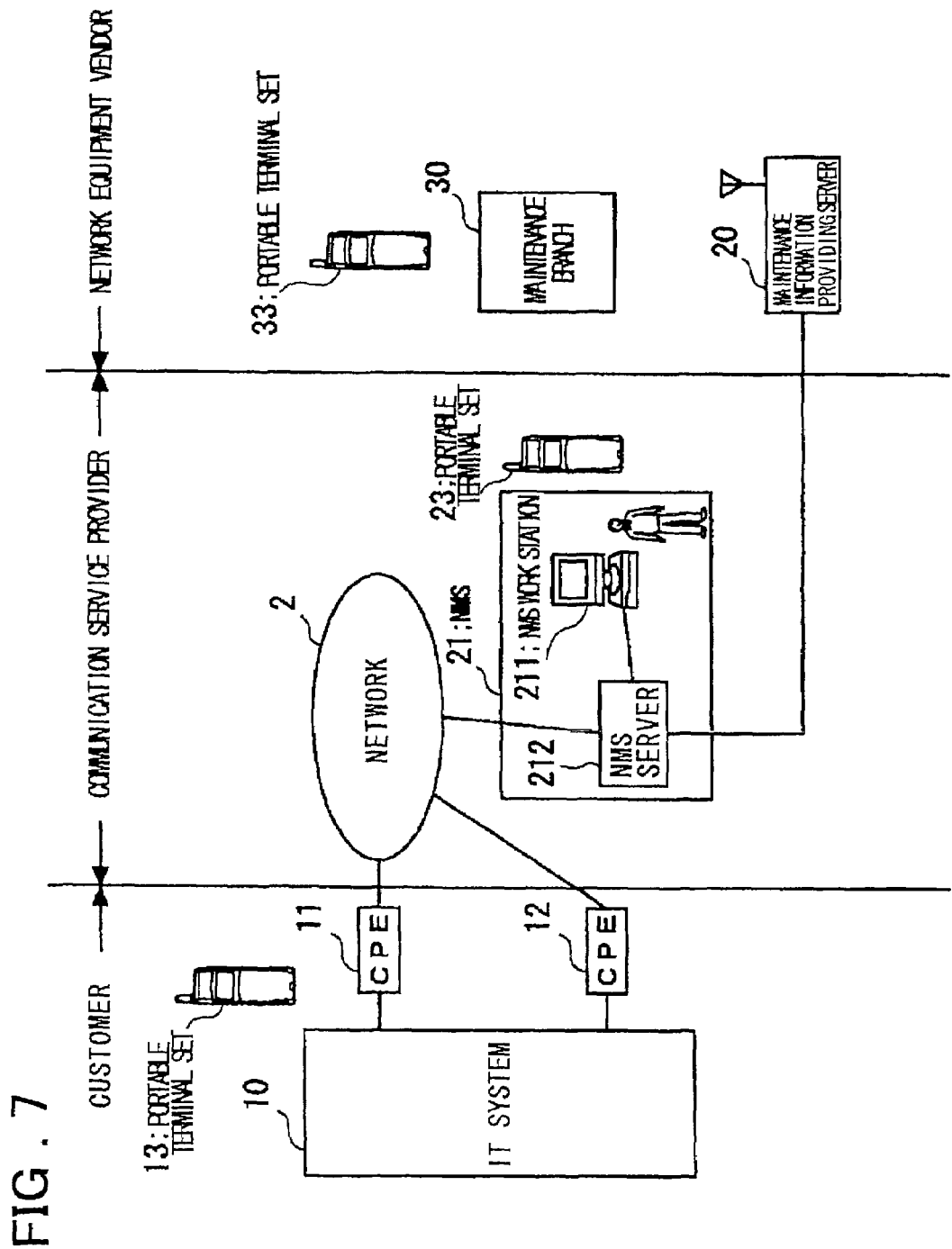
FIG. 7 illustrates a configuration of fifth and sixth embodiments of the present invention.

A fifth embodiment of the present invention is now explained. FIG. 7 illustrates a system structure of a fifth embodiment of the present invention. In this embodiment, the maintenance information providing server 20 is installed in the vendor, whilst in the above-described first to fourth embodiments, the maintenance information providing server 20 is installed in the carrier. The vendor for the carrier performs a server management and supervision for providing maintenance information to the portable terminal gratuitously or non-gratuitously.

The carrier entrusts the management and supervision of the maintenance information-providing server to the vendor by outsourcing so as to be thereby emancipated from an equipment investment or management and supervision.

A sixth embodiment of the present invention is explained. The structure of the sixth embodiment of the present invention is the same as the fifth embodiment shown in FIG. 7. In the present sixth embodiment, the management and supervision of the maintenance information providing server in the fifth embodiment is carried out by a maintenance service undertaker other than the vendor (a business company who entered into a contract with carrier and the vendor as to maintenance contract and confidentiality). This operating mode can also achieve the object of the present invention.

Figure 8:
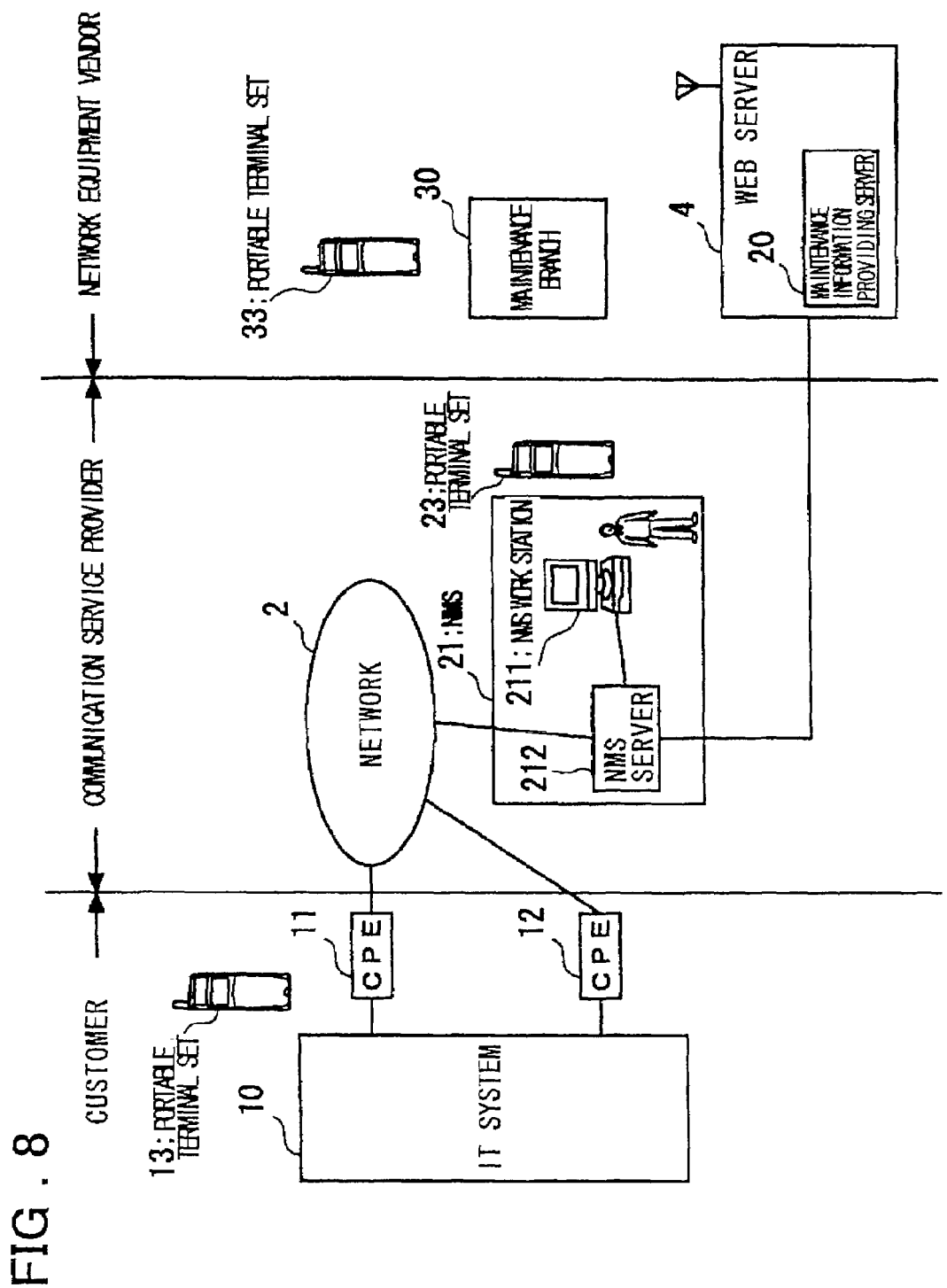
FIG. 8 illustrates a configuration of seventh and eighth embodiments of the present invention.

A seventh embodiment of the present invention is now explained. FIG. 8 illustrates a system structure of the seventh embodiment of the present invention. In the above-described seventh embodiment, the maintenance information providing server 20 installed on the vendor in the above-described fifth embodiment is implemented by adding a function of notifying maintenance information to predetermined portable terminals of the carrier, vendor and customers in accordance with the present invention to a pre-existing Web server 4 which is installed in the vender for performing information providing services to users. In this embodiment, as in the above-described fourth embodiment, no new equipment investment is needed because the pre-existing server 4 can be used.

An eighth embodiment of the present invention is now explained. In the present eighth embodiment of the present invention, the management and supervision of the maintenance information providing server is performed by a business company other than the vendor forte carrier gratuitously or non-gratuitously.

Figure 9:
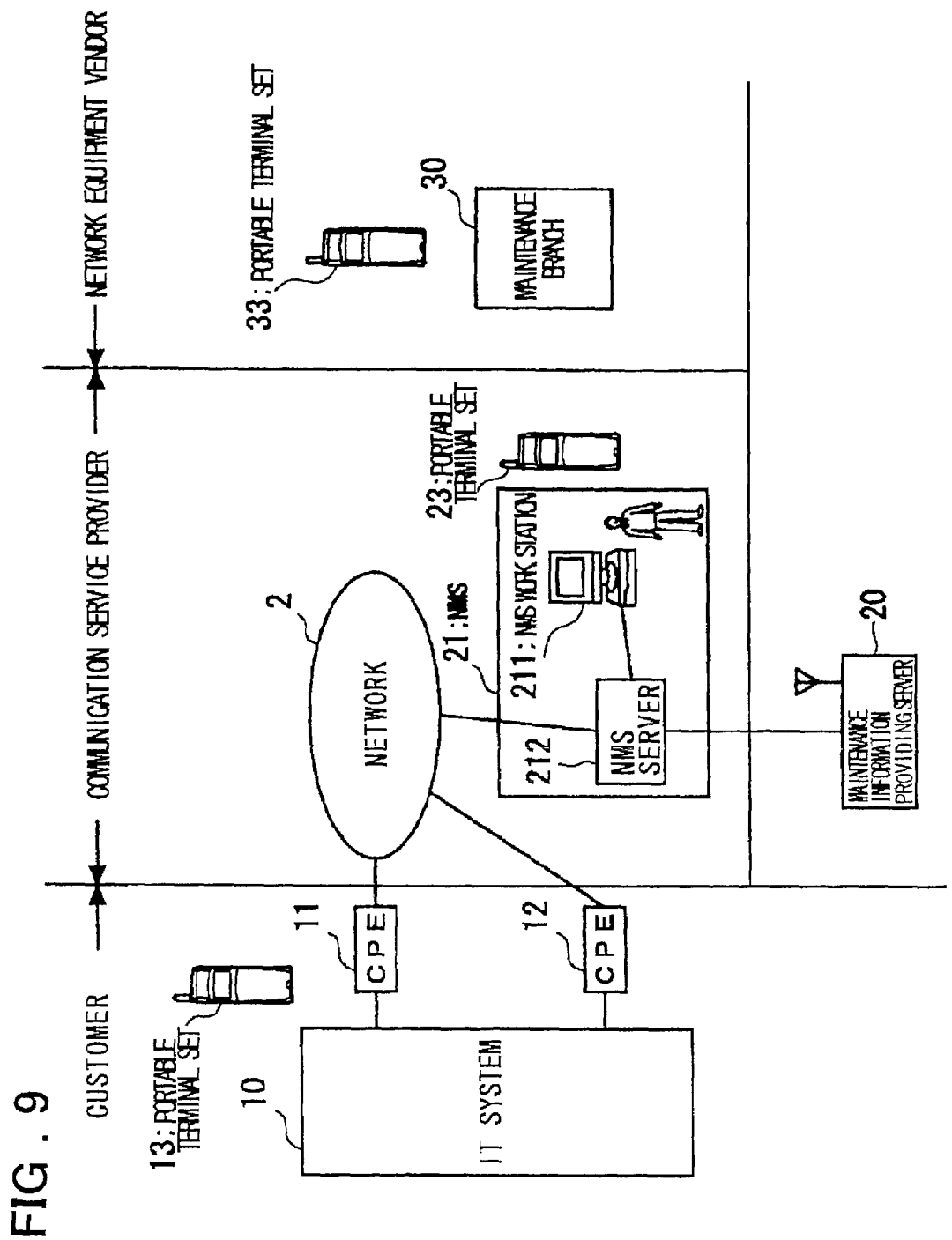
FIG. 9 illustrates a configuration of ninth and tenth embodiments of the present invention.

A ninth embodiment of the present invention is now explained. FIG. 9 illustrates a system structure of the eighth embodiment of the present invention. In the present ninth embodiment, the maintenance information-providing server 20 for providing maintenance information is installed in a maintenance business company other than the carrier and the vendor. The management and supervision of the maintenance information providing service is performed by the maintenance service Business Company for the carrier gratuitously or non-gratuitously.

A tenth embodiment of the present invention is now explained. Referring to FIG. 9, with the present tenth embodiment, the management and supervision of the maintenance information providing server 20 installed in the maintenance service business company is executed by a maintenance service business company other than the maintenance service business company which has installed the maintenance information providing server 20 gratuitously or non-gratuitously.

Figure 10:
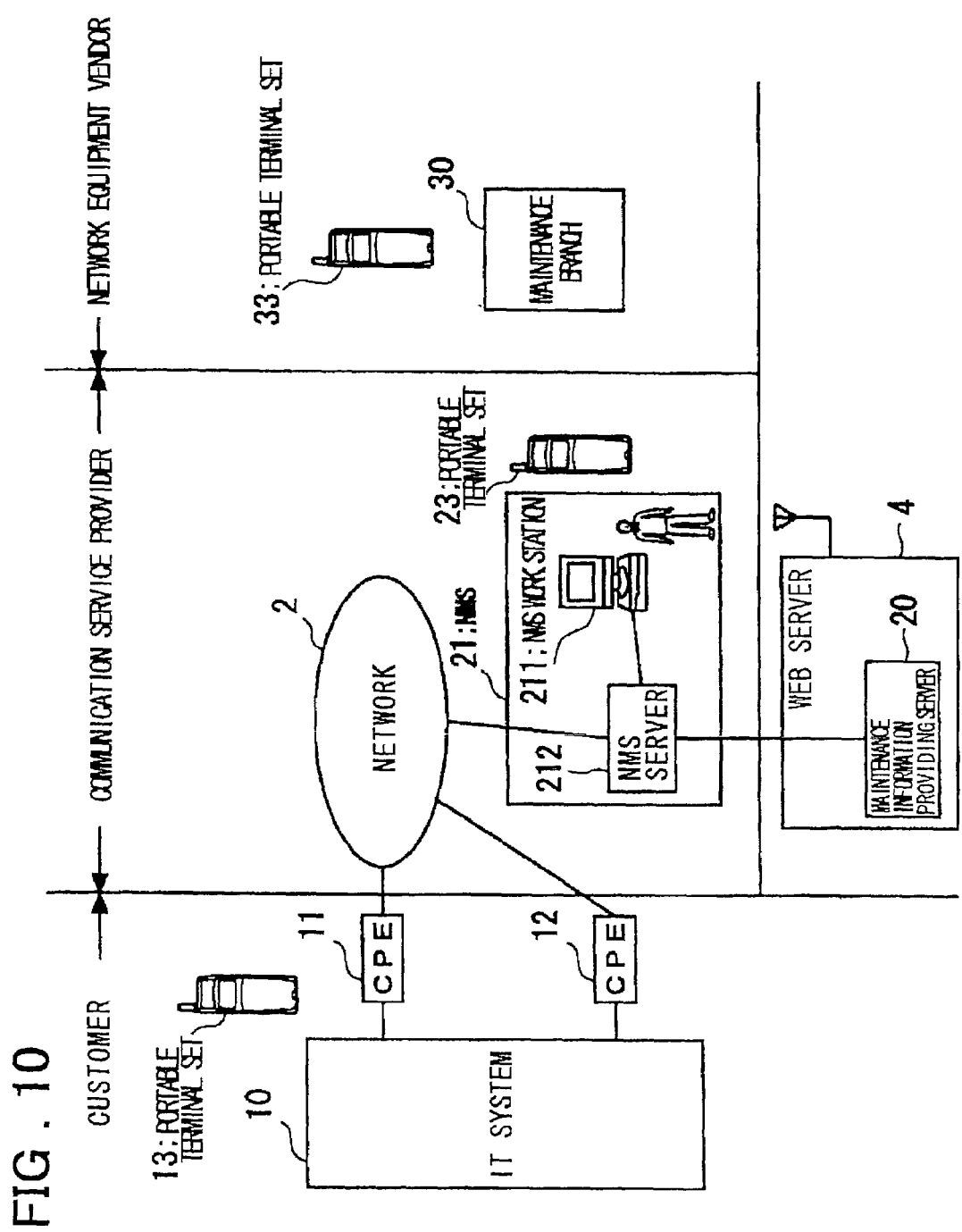
FIG. 10 illustrates a configuration of eleventh and twelfth embodiments of the present invention.

An eleventh embodiment of the present invention is now explained. FIG. 10 illustrates a system structure of the eleventh embodiment of the present invention. In the present eleventh embodiment, the maintenance information providing function is added to the Web server 4, already installed in the maintenance service business company, by way of operating as the maintenance information providing server 20 installed in the maintenance service business company in the above-described ninth embodiment. In the present embodiment, as in the previous fourth embodiment, equipment investment is unneeded because the pre-existing Web server 4 is utilized.

In the twelfth embodiment of the present invention, the management and supervision of the maintenance information providing server 20 installed in the maintenance service business company may be performed by another maintenance service business company gratuitously or non-gratuitously.

A thirteenth embodiment of the present invention is hereinafter explained. The present thirteenth embodiment is applied to such a system in which, when an operation such as maintenance operations, e.g., network testing, network construction, such as extension, modification, renewal or periodical inspection, is to be performed on a network, necessary information, such as the information on the test, construction site, construction area or operating schedules, is notified from the maintenance information providing server that stores and holds the information to each portable terminal of a maintenance personnel or a personnel in charge of construction in the carrier, vendor, or maintenance service business company or to portable terminal of a personnel in charge of construction in a construction undertaking business company. Such an arrangement may also be made that the information on network test, construction schedule, state of progress and completion of the construction will be transmitted from the maintenance information-providing server to the customer.

In a thirteenth embodiment of the present invention, respective system configurations, explained in the first to twelfth embodiments, may directly be applied as a system configuration. The information pertinent to testing and construction of the network is notified from the maintenance information providing server 20 to each portable terminal, a telephone number and/or an electronic mail address of which have been previously registered in the maintenance information providing server 20. Detailed information pertinent to testing and construction is furnished from the maintenance information providing server 20 to the portable terminal of the personnel in charge found to be proper as a result of an authentication of a password that is entered from the portable terminal and transferred to the maintenance information providing server 20.

In this thirteenth embodiment, the maintenance information providing server 20, by providing information pertinent to testing, periodic inspection and construction in addition to network malfunction information, can integrate update and management of the network maintenance information, and simplifies to realize a prompt furnishment of latest information to personnel in charge of maintenance and construction and customers.

A plurality of maintenance information providing servers may be provided and the network testing and construction information is provided by a maintenance information providing servers different from a maintenance information providing server providing the network malfunction information, as shown in FIG. 5. Alternatively, a function of providing information pertinent to the network testing and the construction may be implemented on a pre-existing Web server.

In the present thirteenth embodiment, information to be furnished is again sorted, as in the previous first embodiment, such that, for example, a customer information is not furnished to a personnel in charge of construction of a construction undertaking business company.

Meanwhile, the network is not limited to e.g., ISDN, but may be applied to any arbitrary network.

The present invention has so far been explained with reference to the preferred embodiments. However, these embodiments are merely illustrative and are not intended for limiting the present invention. It is to be noted that the present invention comprises a variety of modifications and improvements that may be within the reach of those skilled in the art within the scope as defined in the claims.

The meritorious effects of the present invention are summarized as follows.

The first meritorious effect of the present invention is that, since malfunction information of a network management system (NMS) can be immediately notified to maintenance personnel of a communication service provider (carrier), network equipment or to a network management system furnishing business company (vendor), an arrangement for malfunction recovery can be made more promptly than in the case of the making confirmation or request over telephone as was done in the past.

The second meritorious effect of the present invention is that sufficient satisfaction can be assured for customers by adopting a system configuration in which latest information such as information on state of occurrence of malfunction and/or information on recovery process of the malfunction is notified to the customer.

The third meritorious effect of the present invention is that increase in investment and development cost may be suppressed or eliminated by having a maintenance information providing function implemented on a pre-existing Web server. The present invention may be applied to a network management service business with marked effects to achieve outstanding practical advantages.

The fourth meritorious effect of the present invention is that the information pertinent to a network testing, schedule, status of the progress or completion of construction works can be furnished from a maintenance information providing server to a maintenance personnel of a communication service provider (carrier), a personnel in charge of maintenance or construction of a vendor of a network equipment, a undertaker of maintenance service or a construction undertaker, or of a customer so that an arrangement for construction can be made promptly. Moreover, information on a construction can be furnished to a customer to give sufficient satisfaction to the customer.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items might fall under the modifications aforementioned.

What is claimed is:

1. A method for providing network maintenance information, comprising the steps of:
    on an occurrence of a malfunction on a network, acquiring network malfunction information at a maintenance information providing server;
    the maintenance information providing server separating the acquired malfunction information, based on security against information leakage, into
    i) a first category of notification information adapted to maintenance personnel of a communication service provider,
    ii) a second category of notification information adapted to maintenance personnel of a network equipment vendor, and
    iii) a third category of notification information adapted to user-customer personnel,
    from the maintenance information providing server, providing concurrently the notification information of the malfunction to pre-registered portable terminals,
    the pre-registered portable terminals including first terminals of the maintenance personnel of the communication service provider, second terminals of the maintenance personnel of the network equipment vendor, and third terminals of the user-customer personnel, wherein,
    the maintenance information provider server selects and notifies only information necessary for each of said respective categories, the maintenance information provider server withholding unnecessary information from the information content for each said respective category so that the information content of the first, second, and third categories of notification information are different from each other based on the security against information leakage and the information required by each category, and the separating step further comprises
    i) prohibiting customer information from being included in the second category of information sent to the maintenance personnel of the network equipment vendor, the second category of information comprising information on a network equipment suffering from malfunction, and ii) prohibiting carrier insider information and vendor information from being included in the third category of information.

2. The method as defined in claim 1, wherein,
in the notification step, the maintenance information providing server provides notification of the malfunction to pre-registered portable terminals by sending
i) the first category of notification information to the pre-registered portable terminals of the maintenance personnel of the communication service provider,
ii) the second category of notification information to the pre-registered portable terminal of the maintenance personnel of the network equipment vendor, and
iii) the third category of notification information to the pre-registered portable terminals of the user-customer personnel.

3. The method as defined in claim 2, wherein,
the first category of notification information comprises a maintenance service request for taking steps to cure the malfunction, the second category of malfunction information comprises details of malfunctioning network equipment, and the third category of notification information comprises information concerning notice of the occurrence of the malfunction on the network and a scheduled recovery time.

4. The method as defined in claim 1, comprising the further steps of:
the maintenance information providing server communicating the notification with a base station over a wireless link connection; and
transmitting the notification information over a mobile communication network to the portable terminals.

5. The method as defined in claim 1, wherein,
the maintenance information providing server is connected to a portable telephone terminal over a preset interface; and
from the portable telephone terminal, the notification information is transmitted over a mobile communication network to the portable terminals.

6. The method as defined in claim 5, wherein,
the maintenance information providing server performs a control to cause ringing tones of the portable terminal announcing an incoming call concerning the notification depending on seriousness of the malfunction.

7. The method as defined in claim 1, wherein,
the notification information is provided from the maintenance information providing server to the portable terminals via an electronic mail.

8. The method as defined in claim 1, wherein,
the notification information is provided from the maintenance information providing server to the portable terminals via the electronic mail and a telephone communication.

9. The method as defined in claim 8, wherein, the portable terminals:
i) read out the electronic mail sent from the maintenance information providing server,
ii) extract a location information appended in the electronic mail by the maintenance information providing server, and
iii) acquires the notification information using the extracted location information.

10. The method as defined in claim 1, wherein,
the notification information of the network is provided from the maintenance information providing server to the portable terminals via a plurality of electronic mails sent in a simultaneous mode from the maintenance information providing server to the portable terminals.

11. The method as defined in claim 1, comprising the further steps of:
one of the portable terminals accessing the maintenance information providing server with a password input from the one portable terminal;
authenticating the password by the maintenance information providing server; and
upon the password being authenticated as valid, transmitting the malfunction information by the maintenance information providing server to the one portable terminal.

12. The method as defined in claim 1, wherein,
the maintenance information providing server is made up of a plurality of servers.

13. The method as defined in claim 1, wherein,
the notification is sent by the maintenance information providing server to a Web browser of one of the portable terminals, and
the one portable terminal specifies a URL (uniform resource locator) of the maintenance information providing server to access the notification information furnished by the maintenance information providing server.

14. The method as defined in claim 13 comprising:
a step of the maintenance information providing server prompting the one portable terminal to input a password prior to the portable terminal browsing the notification information at the URL;
a step for the maintenance information providing server having received the password at a time of inputting of a password from the one portable terminal to authenticate the password; and
a step of transmitting the notification information to the one portable terminal when the password is authenticated.

15. The method as defined in claim 1, wherein,
the notification information comprises at least one of a name, a place, a device number and a device name of a station where is located the malfunction.

16. The method as defined in claim 1, wherein,
the notification of the malfunction is provided from the maintenance information providing server over a mobile communication network to the portable terminals.

17. A system for providing network maintenance information comprising:
a network management system managing a network and acquiring information of a network malfunction; and
a maintenance information providing server receiving the malfunction information from the network management system,
the maintenance information providing server configured to separate the acquired malfunction information, into plural categories of notification information with security-sensitive information of each category being sorted out and excluded from the other categories, including
i) a first category of notification information adapted to maintenance personnel of a communication service provider,
ii) a second category of notification information adapted to maintenance personnel of a network equipment vendor, and
iii) a third category of notification information adapted to user-customer personnel, information content of the first, second, and third categories of notification information being different from each other based on the maintenance information provider server sorting out and notifying only information necessary for each of said respective categories, the maintenance information provider server withholding unnecessary information from the information content for each respective category, the maintenance information providing server configured to provide the notification information of the network malfunction to pre-registered portable terminals, the pre-registered portable terminals including terminals of the maintenance personnel and terminals of the user-customer personnel, wherein, for each of said first, second, and third categories, said maintenance information providing server selects notification information and provides notification of only information respectively necessary for each of said categories, and wherein, the maintenance information providing server is configured to separate the acquired malfunction information into the plural categories of notification information by prohibiting customer information from being included in the first and second categories of notification information, and prohibiting carrier insider information and vendor information from being included in the third category of notification information.

18. The system of claim 17, wherein,
the maintenance information providing server is configured to separate the acquired malfunction information into the plural categories of notification information based on i) security against information leakage and ii) maintenance functions to correct the network malfunction.

19. The system of claim 18, wherein, the maintenance information providing server is configured to provide the first category of notification information to the maintenance personnel of a communication service provider, the second category of notification information to the maintenance personnel of a network equipment vendor, and the third category of notification information to the user-customer personnel.

20. The system of claim 19, wherein, the first and second categories of notification information include maintenance service requests for taking steps to cure the malfunction, and the third category of notification information comprises information concerning notice of the occurrence of the malfunction on the network and a scheduled recovery time.

21. The system of claim 19, wherein,
the maintenance information providing server is made up of a plurality of servers; and
the servers perform processing of notification information to the communication service provider, the vendor and to the customers connected to the network in a way of a distributed processing.

22. The system of claim 17, wherein,
the maintenance information providing server is configured to exclude customer information from the first and second categories of notification information to prevent customer information from being sent to the maintenance personnel.

23. The system of claim 17, wherein,
the maintenance information providing server comprises means for connecting with a radio base station over a wireless connection link and to provide the notification information to the portable terminals over a mobile communication network.

24. The system of claim 17, wherein,
the maintenance information providing server is connected over a preset interface to a portable telephone terminal, and
the maintenance information providing server provides the notification information from the portable telephone terminal over a radio base station to the portable terminals.

25. The system of claim 17, wherein,
the maintenance information providing server comprises means for transmitting and receiving an electronic mail; and
the maintenance information providing server provides the notification information to the portable terminal with an electronic mail or with an electronic mail and a telephone communication.

26. The system of claim 25, wherein,
a plurality of the electronic mails providing notification of the malfunction are sent in a broadcast mode from the maintenance information providing server to a plurality of the portable terminals.

27. The system of claim 25, wherein, the portable terminals:
i) read out the electronic mail sent from the maintenance information providing server,
ii) extract a location information appended in the electronic mail by the maintenance information providing server, and
iii) acquires the notification information using the extracted location information.

28. The system of claim 27, wherein, one of the portable terminals accesses the maintenance information providing server with a password input from the one portable terminal, and upon the password being authenticated as valid by the maintenance information providing server, the notification information is provided by the maintenance information providing server to the one portable terminal.

29. The system of claim 17, wherein,
the pre-registered portable terminals include a terminal of a network manager.

30. The system of claim 17, wherein,
the maintenance information providing server is connected for communication to a network management server of the network management system arranged in the communication service provider managing and supervising the network,
the network management server collects data of operating state of the network equipment and the network, and
on occurrence of the malfunction on the network, the malfunction information of the network is transferred from the network management server to the maintenance information providing server.

31. The system of claim 17, wherein,
the maintenance information providing server is not connected for on-line communication to a network management system arranged in the communication service provider managing and supervising the network,
the network management server collects state of operation information of the network equipment and the network, and
the maintenance information providing server in an off line mode receives the network malfunction information acquired by the network management server.

32. The system of claim 17, wherein,
the portable terminals have a browser function for browsing a Web server on the Internet, and the portable terminals comprise means for accessing and browsing a Web server on the Internet to specify a URL (uniform resource locator) of the maintenance information providing server functioning as the Web server to browse details of the malfunction information.

33. The system of claim 32, wherein,
the maintenance information providing server prompts the portable terminal to input a password prior to the portable terminal browsing the malfunction information, authenticates the password when a password is input from the portable terminal, and transmits the malfunction information to the portable terminal when the password is authenticated.

34. The system of claim 33, wherein,
the malfunction information displayed on a screen of a portable terminal of the maintenance personnel contains at least one of a name, a place, a device number and a device name of a station where is arranged the malfunctioning network equipment.

35. The system of claim 17, wherein,
a maintenance operation of the network is carried out by an inputting operation from the portable terminal through the maintenance information providing server and the network management system.

36. The system of claim 17, wherein,
the maintenance information providing server performs a control to cause a ringing tone of the portable terminals announcing an incoming call depending on seriousness of the malfunction.

37. The system of claim 17, wherein,
the maintenance information providing server is configured to further provide maintenance information pertinent to testing of the network to the portable terminals of the maintenance personnel.

38. A system for providing network maintenance information comprising:
a maintenance information providing server configured to receive network malfunction information including customer confidential information, carrier insider information and vendor information,
the server configured to sort and separate the acquired malfunction information, into plural categories of notification information based on information security restriction criteria, including
i) a first category of notification information adapted to maintenance personnel of a communication service provider,
ii) a second category of notification information adapted to maintenance personnel of a network equipment vendor, and
iii) a third category of notification information adapted to user-customer personnel,
the maintenance information providing server configured to provide the notification information of the network malfunction to preregistered portable terminals,
the pre-registered portable terminals including terminals of the maintenance personnel and terminals of the user-customer, wherein,
information content of the first, second, and third categories of notification information is different from each other, based on the maintenance information providing server sorting out information unnecessary for each category and notifying each category of only information necessary for that category,
the customer confidential information is sorted out from the first and second categories of notification information,
the carrier insider information and the vendor information is sorted out from the third category of notification information,
the first category of notification information includes information relating to a malfunction occurrence position, a malfunctioning apparatus, and customers influenced by the malfunction,
the second category of notification information is limited to only information relating to the malfunctioning apparatus, and
the third category of notification information is limited to whether a failure has occurred or recovered.

39. The system of claim 38, wherein, the maintenance information providing server is further configured to separate the acquired malfunction information into the plural categories of notification information based on maintenance functions to correct the network malfunction with separate maintenance functions being assigned to the first and second categories of information.

40. The system of claim 39, wherein, the maintenance information providing server is configured to provide the first category of notification information to the maintenance personnel of a communication service provider, the second category of notification information to the maintenance personnel of a network equipment vendor, and the third category of notification information to the user-customer personnel.

41. The system of claim 39, wherein, the first and second categories of notification information include maintenance service requests for taking steps to cure the malfunction, and the third category of notification information comprises information concerning notice of the occurrence of the malfunction on the network and a scheduled recovery time.

42. The system of claim 38, wherein said maintenance information providing server is arranged on a vendor for supplying a network equipment, a plurality of said network equipments being interconnected to constitute said network, and is managed and supervised by said vendor or by a maintenance service business company.

43. The system of claim 38, wherein said maintenance information providing server is installed in a premises of a maintenance service business company different from a vendor for furnishing a network equipment, a plurality of said network equipments being interconnected to constitute said network.

44. The system of claim 43, wherein said maintenance information providing server is managed and supervised by said maintenance service business company or a different maintenance service business company which has undertaken maintenance for the first-stated maintenance service business company.

* * * * *